(12) United States Patent
Factor

(10) Patent No.: US 6,272,523 B1
(45) Date of Patent: *Aug. 7, 2001

(54) DISTRIBUTED NETWORKING USING LOGICAL PROCESSES

(75) Inventor: Michael Edward Factor, Haifa (IL)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/772,663

(22) Filed: Dec. 20, 1996

(51) Int. Cl.$^7$ ..................................................... G06F 15/15
(52) U.S. Cl. ......................... 709/201; 709/102; 709/203; 709/217; 709/218; 709/226; 709/229; 709/245; 707/10; 713/201
(58) Field of Search ..................... 395/200.31, 200.33, 395/200.36, 200.47–200.49, 200.59, 200.75, 670–675; 707/1–5, 9–10, 100–104, 501, 513, 531; 709/102–105, 201–203, 26, 217–219, 227–229, 238–239, 245; 713/200, 201, 202

(56) References Cited

U.S. PATENT DOCUMENTS

| | | | |
|---|---|---|---|
| 4,430,699 | 2/1984 | Segarra et al. | 704/230 |
| 4,980,818 | 12/1990 | Shinmura | 711/147 |

(List continued on next page.)

FOREIGN PATENT DOCUMENTS 411053279A  2/1999  (JP) ................................. H04L/12/54

OTHER PUBLICATIONS

J. Derby, et al., Scoping Multicasts in Wan–Interconnected Local Networks, vol. 34, No. 8, Jan., 1992.
C. Mohan and I.S. Narang, Method for Data Based Recovery in Client–Server Architectures, vol. 37, No. 06A, Jun., 1994.
C.P. Copeland, et al., Microkernel Extension for Dirty Time Limit, vol. 37, No. 04B, Apr., 1994.
J. David Narkiewicz, et al., Pilgrim's OSF DCE–based Services Architecture (No Date).
Thomas T. Kwan, et al., NCSA's World Wide Web Server: Design and Performance, 1995.
T. Anthias, "Inter–Client Resource Usage in Distributed Client–Server Presentation Manager System", *IBM® Technical Disclosure Bulletin*, IBM Corp., vol. 34, No. 4B, (Sep. 1991), pp. 416–417.
J. M. Knapman, "Generating Specific Server Programs in Distributed Object–Oriented Customer Information Control System", *IBM® Technical Disclosure Bulletin*, IBM Corp., vol. 38, No. 01, (Jan. 1995), pp. 411–414.
G. L. Child et al., "Migration Utility for Distributed Computing Environment Application Enabler for OS/2", *IBM® Technical Disclosure Bulletin*, IBM Corp., vol. 38, No. 03, (Mar. 1995), pp. 473–476.

Primary Examiner—Zarni Maung
Assistant Examiner—Bharat Barot
(74) Attorney, Agent, or Firm—Schmeiser, Olsen and Watts

(57) ABSTRACT

Disclosed is a system and method for load balancing on a computer network that utilizes two levels of addressing abstraction—logical and physical. Logical processes are mapped to physical processes using a logical interface and may be done in a one-to-one, one-to-many, or many-to-one fashion. The mapping is dynamic in the sense that mapping decisions may include selection functions that can be changed on the fly so that servers can be added or removed in a manner that is relatively transparent to the client. The system and method are also applied to the World Wide Web so that web sites can also dynamically distribute processes over a plurality of servers.

19 Claims, 6 Drawing Sheets

U.S. PATENT DOCUMENTS

| | | | |
|---|---|---|---|
| 5,111,389 | 5/1992 | McAuliffe et al. | 711/203 |
| 5,117,350 | 5/1992 | Parrish et al. | 711/1 |
| 5,222,242 | 6/1993 | Choi et al. | 709/227 |
| 5,249,290 | 9/1993 | Heizer | 709/105 |
| 5,301,337 | 4/1994 | Wells et al. | 709/104 |
| 5,341,478 | 8/1994 | Travis, Jr. et al. | 709/203 |
| 5,369,570 | 11/1994 | Parad | 705/8 |
| 5,371,852 | 12/1994 | Attanasio et al. | 709/245 |
| 5,390,297 | 2/1995 | Barber et al. | 713/201 |
| 5,459,837 | 10/1995 | Caccavale | 709/226 |
| 5,548,506 | 8/1996 | Srinivasan | 705/8 |
| 5,548,724 * | 8/1996 | Akizawa et al. | 709/203 |
| 5,572,643 * | 11/1996 | Judson | 709/218 |
| 5,603,029 * | 2/1997 | Aman et al. | 709/105 |
| 5,678,041 | 10/1997 | Baker et al. | 707/9 |
| 5,715,395 | 2/1998 | Brabson et al. | 709/226 |
| 5,751,961 * | 5/1998 | Smyk | 709/217 |
| 5,764,490 | 6/1998 | Edelstein et al. | 709/214 |
| 5,765,154 | 6/1998 | Horikiri et al. | 707/10 |
| 5,768,510 * | 7/1998 | Gish | 703/203 |
| 5,774,660 * | 6/1998 | Brendel et al. | 709/201 |
| 5,787,435 * | 7/1998 | Burrows | 707/102 |
| 5,802,299 * | 9/1998 | Logan et al. | 709/218 |
| 5,815,665 * | 9/1998 | Teper et al. | 709/229 |
| 5,892,905 * | 4/1999 | Brandt et al. | 709/202 |
| 5,963,915 * | 10/1999 | Kirsch | 709/203 |
| 6,026,394 * | 2/2000 | Tsuchida et al. | 709/201 |
| 6,049,829 * | 4/2000 | Li | 709/229 |
| 6,058,423 * | 5/2000 | Factor | 709/226 |

\* cited by examiner

TABLE 1

| Logical Server Process | Server Class | Begin | End | Physical Server Process |
|---|---|---|---|---|
| 1 | DSM-LLSP | 0 | $2^{63}$ | p1ahost1 |
|  |  | $2^{63}+1$ | $2^{64}-1$ | p3ahost3 |
| 2 | FS |  |  | p5ahost5 |
| 3 | FS |  |  | p5ahost5 |
| 4 | NS | 0 | 0 | p6ahost6 |
|  |  | 1 | 1 | p7ahost7 |
|  |  | 2 | 2 | p8ahost8 |

FIG. 5

TABLE 2

| Logical Server Process | Server Class | Begin | End | Physical Server Process |
|---|---|---|---|---|
| 1 | DSM-LLSP | 0 | $2^{62} - 1$ | p1@host1 |
| | | $2^{62}$ | $2 \times 2^{62} - 1$ | p2@host2 |
| | | $2 \times 2^{62}$ | $3 \times 2^{62} - 1$ | p3@host3 |
| | | $3 \times 2^{62}$ | $4 \times 2^{62} - 1$ | p4@host4 |
| 2 | FS | | | p5@host5 |
| | FS | | | p5@host5 |
| 3 | NS | 0 | 0 | p6@host6 |
| 4 | | 1 | 1 | p7@host7 |
| | | 2 | 2 | p8@host8 |

FIG. 6

DISTRIBUTED NETWORKING USING LOGICAL PROCESSES

RELATED APPLICATION

This application is related to a separately filed U.S. patent application Ser. No. 08/772,705, entitled "System and Method for Locating Resources in Distributed Network" filed Dec. 23, 1996, now U.S. Pat. No. 6,058,423.

FIELD OF THE INVENTION

The present invention relates to computer networks, and more particularly, the present invention relates to a system and method for performing load balancing on a computer network.

BACKGROUND OF THE INVENTION

In today's highly networked computer environments, distributed computing is critical because it allows the resources of relatively small computers to be combined to provide a more powerful overall system. Distributed computing allows data and programs to be spread out, or distributed, across networks of heterogeneous computers, in a manner that is transparent to the user. Thus, data that is too large to fit on a single computer may be broken into smaller pieces and stored on several computers, or processes that service a high volume of users may be "duplicated" on many computers to reduce traffic on a single machine.

Most networks utilize a client-server model. Generally speaking, a client is a computer system or process that requests a service of another computer system or process (i.e., a server). A server is the software or system responsible for making local documents, files or processes available to clients. For example, a workstation requesting the contents of a file from a file server is a client of that file server. There are numerous network configurations, such as local area networks (LANs), which may include small intranets, and wide area networks (WANs), which may include the Internet or large intranets. Communicating and data transferring amongst clients and servers within a network is regulated by various protocols. For example, TCP/IP, which stands for Transmission Control Protocol over Internet Protocol, provides the "connectivity" rules for systems on the Internet. HTTP, which stands for HyperText Transmission Protocol, is a data transfer protocol used by the World Wide Web (WWW) that sits on top of TCP/IP.

In distributed computing, clients traditionally identify servers by name, using a "name server" to map between the name and a currently active communications address for the server process. For example, the Internet utilizes the domain name system (DNS) to map from a domain name for a machine (e.g., abc.xyz.com) to an Internet Protocol (IP) address. Unfortunately, the name server approach suffers from various weaknesses that exist both on the Internet and on smaller networks. First, the mapping between the name by which the client knows the server and the process that implements the server is typically one-to-one. That is, only one server can service the client when a server name is requested by the client. Second, the communication address of the server cannot be changed without changing at least some of the clients. Thus, if a server is overloaded, it is not straightforward to divide its responsibility among two machines without modifying some of the clients. Third, the client must pay the overhead of contacting the name server each time the client executes. That is, it cannot directly code the address of the server. Fourth, under many networking systems, the physical address of a server process can change each time a server starts to execute (e.g., after recovering from a machine failure), invalidating any physical addresses previously obtained by a client for a naming server.

While there have been numerous attempts made to provide improved load balancing on computer networks, none address all of the above-mentioned problems. For example, distributed computing, or load balancing, on the Internet is typically done at the name server level by mapping a single machine name to multiple IP addresses. Each time a domain name is looked up by the name server (DNS), a different IP address can be returned in a round-robin fashion, thereby allowing a limited form of load balancing among a set of functionally identical machines all having the same DNS name. This system also supports coalescing of multiple machine names to have a single IP address. DNS is limited in that it supports load balancing only in a round-robin fashion and requires the servers to be homogeneous. In particular, it does not allow partitioning of data (e.g., a set of very large files containing movies among a set of servers). Moreover, because the load balancing is done at the level of requests to the name server, and given the heavy use of caching in DNS (i.e., clients "remember" or store IP addresses if recently used to avoid future look-ups), the possibility of unbalanced loads is substantial.

Another known method of performing load balancing on computer networks involves the use of TCP/IP routers which allow a front end node or gateway to direct communications to one or more homogeneous back end nodes. Thus, all communications with the cluster are addressed to a single computer, and all communications with the back end nodes are transparent to the user. U.S. Pat. No. 5,371,852, issued to Attanasio et al. on Dec. 6, 1994 and assigned to IBM Corp. discloses such a system and method. In particular, the system includes a message switch for changing the information in the message header based upon a specific routing function that is selected using port and protocol information in port type messages. Unfortunately, this system is limited because, among other things, the nodes within the cluster must be homogeneous and located proximate to each other.

Load balancing is of critical importance on the World Wide Web (hereinafter, the "Web"), where explosive growth has, and will continue to occur. The Web is a distributed information system comprising a network of computers located throughout the world that communicate using the Internet. The Web allows users to create, browse or edit hypertext documents in massive client-server environment. Two primary components of the Web are Web Browsers (i.e., the software, associated with the client, designed to browse the Web), and Web Pages (i.e., the documents or processes, associated with the server, available via the Web Browsers). Each Web Page has a specific Web address known as a Uniform Resource Locator (URL). URL's provide not only the location of a file in a directory on a particular machine, but can also point to some other type of service and then further determine how the file/service is to be served. However, because URL's include a domain name, the Web is faced with the same limitations as those presented above. Namely, a name server (i.e., DNS) must be utilized, thereby limiting the ability to perform any meaningful load balancing.

Another area where improved load balancing is required is on intranet systems, which are typically used within large organizations to provide features similar to those found on the Internet. Such systems allow for efficient and varied inter-organizational communications, but are subject to the same limitations as those mentioned above.

Thus, without a better way of load balancing, performance of computer networks will be impaired. All of the above references are hereby incorporated by reference.

SUMMARY OF THE INVENTION

The present invention provides load balancing in a distributed network system by providing server processes that include two levels of abstraction, logical and physical. Physical processes, by assumption, have addresses supported by the transport mechanism while logical processes do not. Each logical process is implemented by a set of physical processes and the system maintains the mapping between the two. The system also provides interfaces that enable a client to send a message to a logical process, automatically redirecting the message to an appropriate physical process.

The mapping from logical to physical processes can be one-to-one, many-to-one, or one-to-many. If highly available processes are desired, each physical process can be replicated. The mapping between logical and physical processes is dynamic and may be changed by the administrator. By defining two layers, logical and physical processes, two seemingly conflicting goals can be achieved simultaneously. First, a low-level, compact address may be used in a persistent fashion for each logical process. Thus, a bulky inefficient to use, character string based name is not required. However, the flexibility of dynamic configuration greater than that presently provided by name servers can be achieved. Since logical processes do not consume resources (beyond their logical address), they can exist forever without preventing dynamic reconfiguration of the system. At any point in time, the logical server may be implemented by different numbers of physical processes. If a particular server becomes a bottle neck, (i.e., there are many requests to the server), the administrator may decide to partition the server's work across several physical processes. Alternatively, if there are few requests to the server, it can be coalesced with other servers which can be jointly implemented by a single physical process.

To manage the mapping between logical and physical servers, a sub-set of the machines are implemented as mapping servers. These can be the same machines running name servers or some other sub-set of machines. The mapping servers will be contacted, in a manner transparent to the client, to map from logical to physical addresses when a client attempts to send a message to a server using a logical address. To improve performance, clients can cache this mapping. Moreover, the cache can be managed either with an active or lazy cache invalidation policy. If it is managed with a lazy cache invalidation policy, clients will need the ability to contact the mapping server if a mapping obtained from the cache turns out to be invalid.

The mapping servers and client-side cache will be hidden from the application. The system will provide the application a set of interfaces that support sending a message to the address of a logical process and the implementation of these interfaces will be responsible for redirecting the message to an appropriate physical process.

When a logical process is created, it is assigned a universally unique, persistent identifier. There are several options for assigning universally unique identifiers, including using a central authority or delegating to each mapping server responsibility for assigning unique identifiers to other servers by allocating to each mapping server a range of identifiers.

As described above, the mapping from logical to physical processes can be one-to-one, many-to-one or one-to-many. This mapping is dynamically maintained by the mapping servers with each mapping server typically knowing the entire mapping. The method and system described herein allow a single logical process to be implemented by multiple physical processes. In order to achieve this, the system must first determine to which physical process to send a message (e.g., a random choice may often suffice if all of the physical processes are identical). In certain cases however, it may be desired not only to partition the work load assigned to a physical process but also the data stored by the server. For example, on the Web, where several servers may be available to service a unique client request, hashing based upon a cookie (i.e., a piece of information exchanged between the server and the client on each request) could be used to partition data or share functions among URL's.

One method of partitioning among the physical processes implementing a given logical server is to assign each logical process a class (typically this would be done by the system's administrator). Then, a selection function associated with each class may be used for mapping a message that is sent to a logical server process to some integral value. When the mapping between logical and physical processes is set up, a range of integral values will be associated with each physical process implementing a given logical process. The entire range of values that can be returned by the selection function for the given class must be covered. Then, when a mapping process needs to determine the address of a physical process for implementing the logical process, it will apply the selection function to the message to be sent, and choose the physical process whose associated range includes the result of applying the selection function. These systems and methods are described in more detail under the detailed description of the preferred embodiments section.

In accordance with the above, it is an advantage of the present invention to provide two levels of abstraction in the server process, logical and physical.

In accordance with the above, it is a further advantage of the present invention to allow clients the ability to perform load balancing via a selection function stored within their cache or on a mapping server.

In accordance with the above, it is a further advantage of the present invention to provide a means of accessing data or resources that have been partitioned among a plurality of heterogeneous computers.

In accordance with the above, it is a further advantage of the present invention to provide the ability to dynamically and transparently repartition the work load of a server among a variable number of processes and machines.

In accordance with the above, it is a further advantage of the present invention to allow clients the ability to use persistent addresses for processes that include efficient, compact, numerical addresses.

In accordance with the above, it is a further advantage of the present invention to provide a system in which the logical address of a server process does not change even if the server is moved to execute on a different computer.

In accordance with the above, it is a further advantage of the present invention to provide a method and system for load balancing on the World Wide Web.

BRIEF DESCRIPTION OF THE DRAWINGS

FIG. 5 depicts a mapping table for mapping from logical to physical processes in accordance with a preferred embodiment of the present invention.

FIG. 6 depicts a modified mapping table for mapping from logical to physical processes in accordance with a preferred embodiment of the present invention.

DETAILED DESCRIPTION OF THE PREFERRED EMBODIMENT

Figure 1:
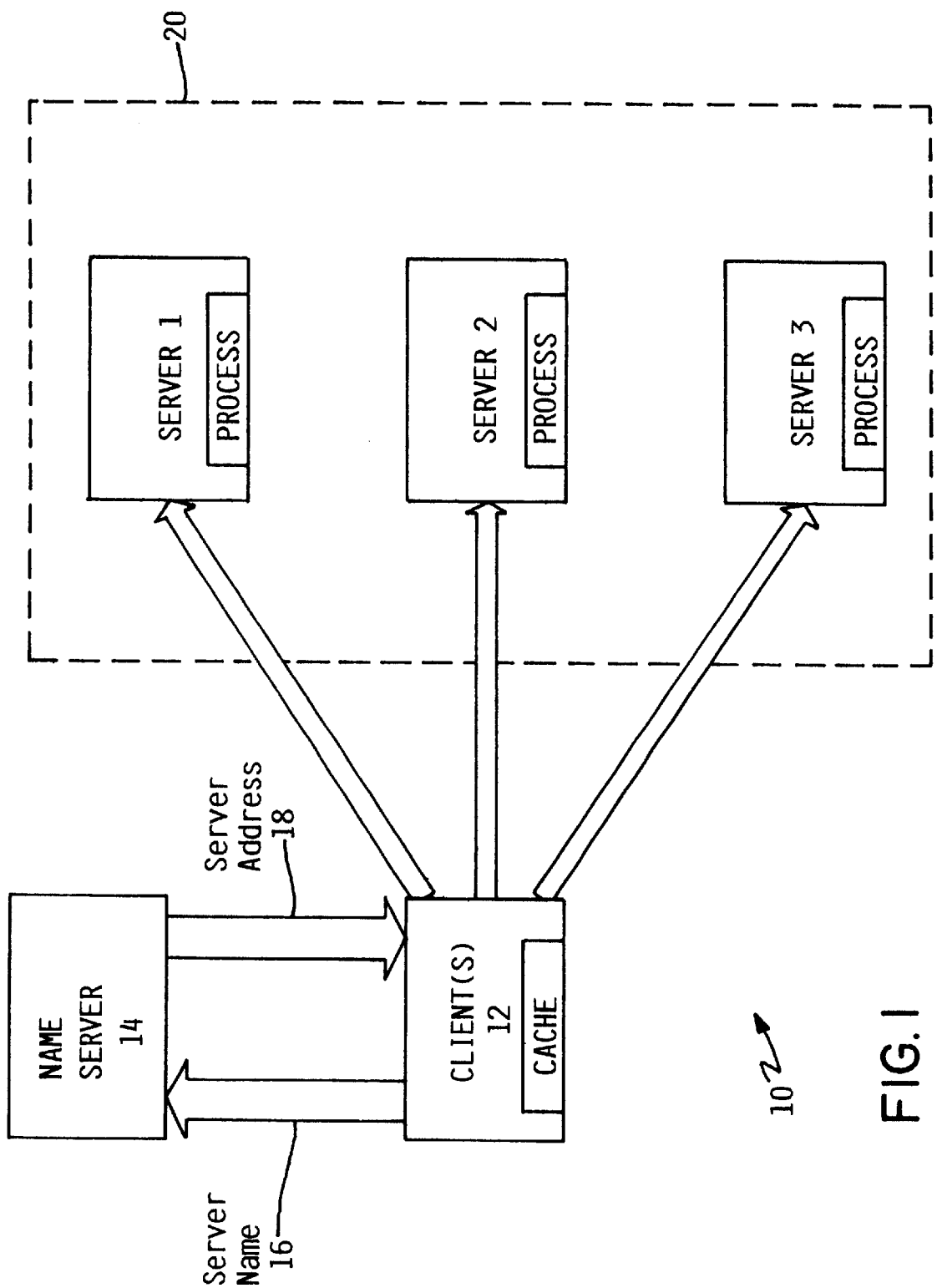
FIG. 1 depicts a block diagram of a typical client server system in which a name server is utilized.

Referring now to FIG. 1, a typical client server system is shown 10. In this traditional system, there exists a plurality of clients 12, a plurality of servers 20, and a name server 14. When a client needs to interact with a particular server process, the client must first contact the name server 14 with a server name 16. The name server 14 then returns to the client the server address 18. For example, in the case of the Internet, a client must give the name server (i.e., DNS) a domain name and the name server then returns an IP address to the client. The IP address can then be used to contact a specific server.

Under this traditional system, if any load balancing is to be done, it is typically done at the name server 14 level. Thus, if servers 1–3 are each configured to include the same physical process desired by the client, the name server may be used to direct the client to server 1, server 2 or server 3 to execute the desired process. However, when a systems administrator decides to add or remove servers to improve load balancing, the name server must be modified, along with some of the clients that may have invalid server addresses in their cache. Additionally, because caching of addresses is commonplace in such systems, a small number of highly "active" clients may dominate and overload a single server, while letting other servers go under utilized.

Figure 2:
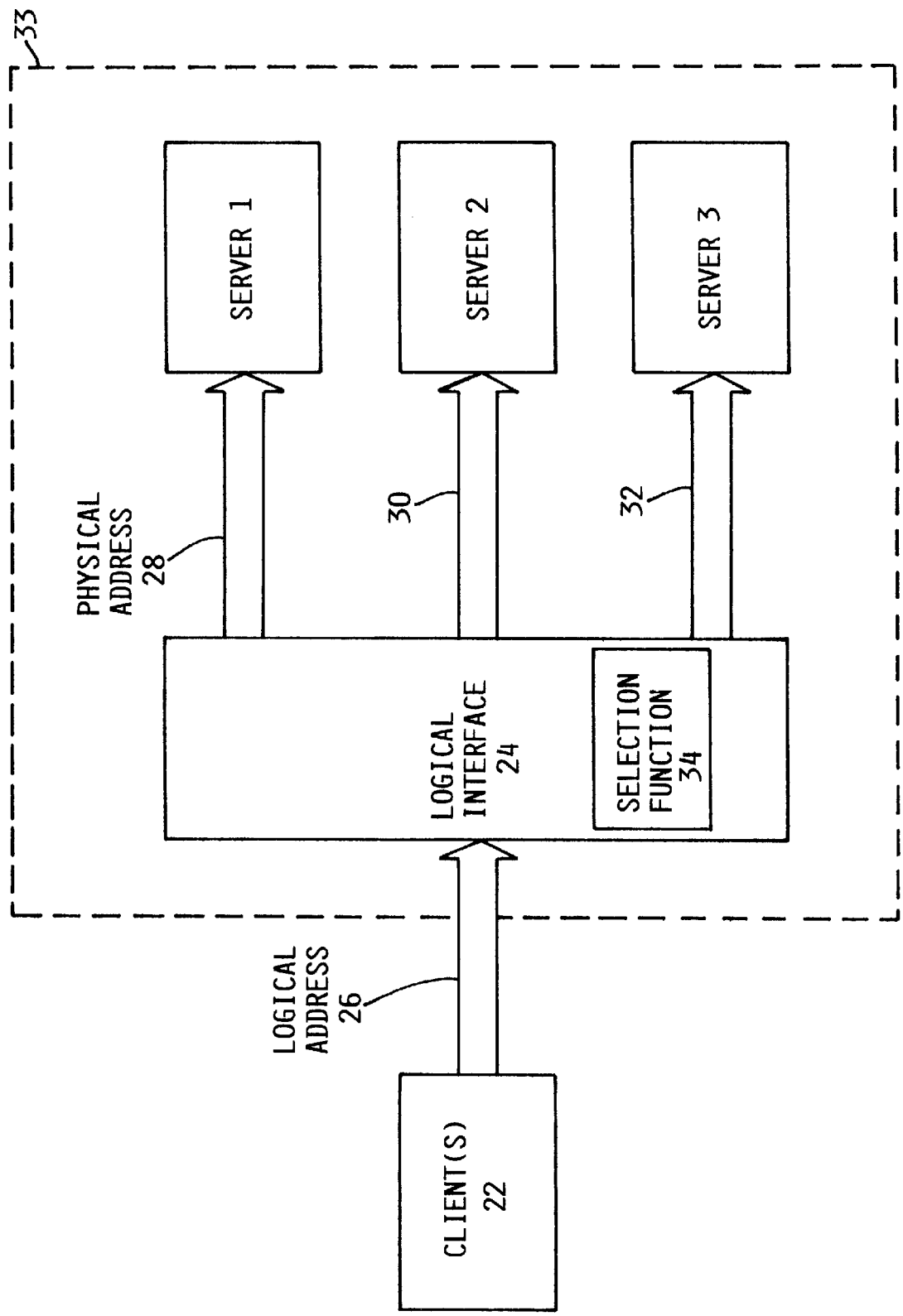
FIG. 2 is a block diagram that depicts a logical interface to perform load balancing in accordance with a preferred embodiment of the present invention.

Referring now to FIG. 2, a block diagram is depicted showing a preferred embodiment of this invention. Here, the name server may be eliminated and the client may interact directly with a logical processing system 33. The logical process system may be implemented in software and reside on any recordable media on some computer in the network. Here, the client sends a logical process or request 26 to a logical interface 24. This process is in form of an actual address rather than a string-based name. The logical interface 24 then uses a mapping server that includes a selection function 34 to select a physical process 28, 30 or 32 associated with server most suited for handling the requested process. The selection function may be programmable so that the systems administrator can tailor how to load balance. In this case, if servers 1–3 each include the ability to handle a requested process, the selection function would dynamically choose an appropriate server. Note that the process on each server would include its own unique physical address 28, 30 or 32 that is transparent to the client. The client need only know the logical address of the logical process 26 to have its process serviced. Thus, pursuant to this embodiment, the load balancing is actually done at the client level (particularly where the selection function is stored in the client's cache) rather than the server level, as with previous methods. This system and method provides increased flexibility in that adding servers or replicating physical processes can all be done within the logical interface system 34 totally transparent to the client 22.

Figure 3:
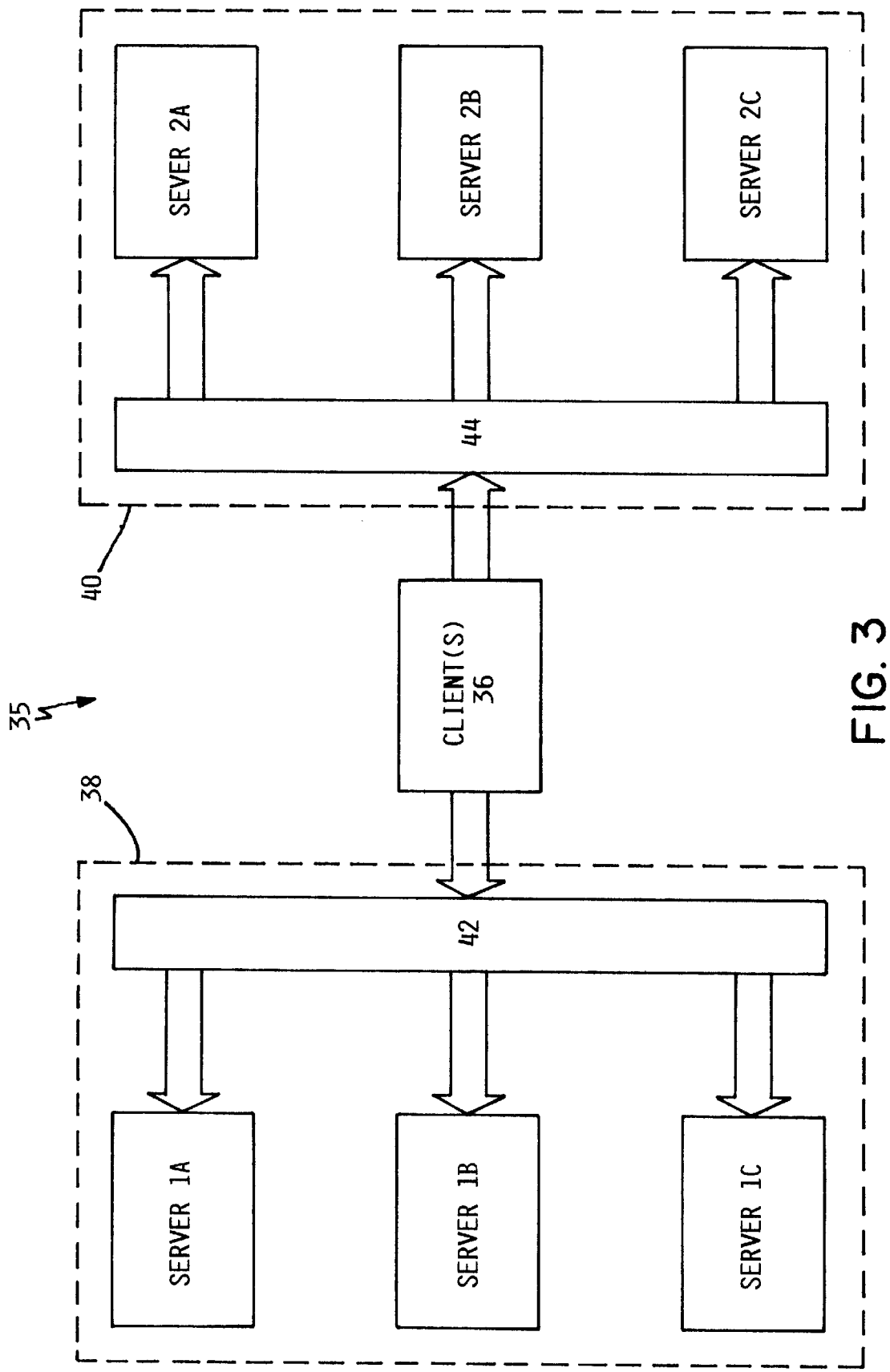
FIG. 3 depicts a block diagram of a system in which a plurality of logical interfaces are used to perform load balancing in accordance with a preferred embodiment of the present invention.

Referring now to FIG. 3, the method and system of the present invention are extended to a more complex network such as the Internet or World Wide Web. On the Web, there exist thousands of Web sites (i.e., servers) each with their own unique address. The ability to load balance at a particular Web site in the past has been limited to what the name server (DNS) could provide. Pursuant to this embodiment, clients 36 are in communication with a plurality of logical server processes or Web sites 38 and 40. Each logical server process includes its own logical interface system 42, 44 that is accessed by a unique logical address. Moreover, each logical interface system would include its own selection function 45, 47 that would dynamically map logical processes to physical processes. The selection function may be programmable, meaning that the system's administrator or web master may tailor the functionality in any fashion. Thus, any Web site that needs to distribute processes among more than one server would use its own selection function to balance the load among servers. For example, if a client 36 wanted to access data on a server owned by logical server process 38 (e.g., SERVER IC), it would not need to know the exact physical address of the server but rather would only need to know the logical address of the logical server process 38. The logical server interface 42 would then map the logical process address to a physical address. Here again, load balancing would be done at the client level (either by the mapping server or the client cache) rather than at the server level, thereby allowing the ability to dynamically distribute work among several servers.

Figure 4:
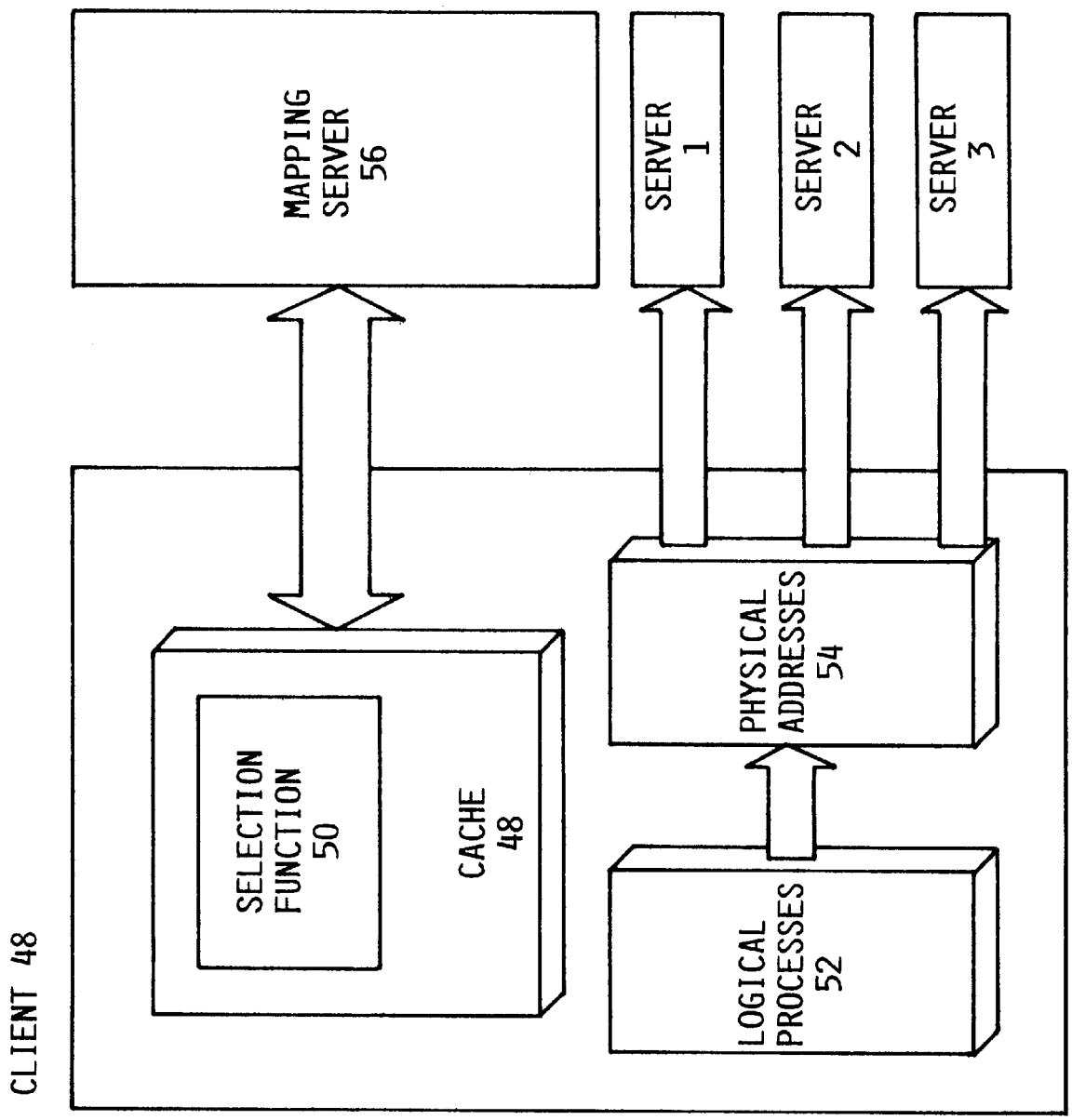
FIG. 4 is a block diagram that depicts a system in which the mapping function is downloaded into the client cache in accordance with a preferred embodiment of the present invention.

FIG. 4 depicts a block diagram showing how a client's cache 48 may be utilized to further enhance, rather than interfere with, the efficacy of this system. When the client 49 selects a logical process, as discussed above, a mapping server 56, which is part of the logical interface system, may be utilized to download the selection or mapping function 50 into the client's cache 48. In the case of a relatively small network, this would only be required as often as the selection was modified. In the case of the Web, the selection function could be downloaded each time a new Web sited is contacted (e.g., via a Java applet). Then, the client could dynamically map the logical process 52 to a physical process 54 to increase overall performance by now directly addressing the desired physical process in a manner totally transparent to an end user utilizing a Web Browser.

It is of critical importance to note that the selection function 50 allows for dynamic mapping between logical and physical processes. That is, the systems administrator for a network or for a Web site can use any type of mapping or heuristic process that will best allocate the load among the network server. Moreover, if the selection function is downloaded into a client's cache, it need not merely contain a physical address of a particular server, but rather, may contain any means for dynamically choosing a server address. Thus, a single client with multiple users sharing a single cache (e.g., a large corporation with many users) will not be locked into a single address for a given process because that address is stored in the cache. Instead, the selection function will decide which physical process to use each time a logical process is requested.

In addition, this system and method can be adapted to perform any type of load balancing and is not just limited to the case where functionally equivalent processes are "duplicated" among more than one server. Other examples include distributed shared memory, where a block of memory is distributed among several servers, straight forward file servers where there exists a one-to-one correspondence between logical and physical processes, and the web where requests may be partitioned among a set of servers increasing the likelihood that the requested resource is cached in memory. It is understood that other types or classes of logical processes also fall within the scope of this embodiment. Some of these "classes" of logical processes are discussed in further detail below with regard to FIGS. 5 and 6.

FIGS. 5 and 6 depict mapping tables for handling different classes of logical processes. Shown in these two tables are four logical server processes characterized into three different classes: DSM-LLSP, FS, and NS. These are examples of possible classes, however, it is recognized that any number of additional classes may be defined and utilized. DSM-LLSP is a distributed shared memory, logical location server process. It returns information on the location of a page of distributed shared memory given an eight byte address for the page of memory. In this example, it is assumed that the work load on the logical server 1 is too great to be implemented by a single physical process and therefore the responsibility of the logical location server process is sub-partitioned. Each physical process that implements a logical location server process is responsible for the sub-range of the address space. The selection function will extract the address in question from the message, and use this address to select the physical process in question. Thus, if a message were sent to logical server process 1, asking about page 0XFFF065490000000, the selection function would lead the message being sent to the physical process whose address page is shown as p3@host3.

FS, which is the class of the second and third logical process, is a file server. In this case, two logical processes have been coalesced to be implemented by a single physical process, p5@host5. Since there is no choice to be made, the selection function will select the single physical process when mapping from logical to physical process in this case. The final class of logical process shown in this example is NS, that is a name server. In this case, it is assumed that the work load of the server process requires partitioning and that any of such physical processes are capable of answering any question (e.g., all three physical processes have complete access to the name server data base). In this case, the selection function may implement a heuristic that ignores its input and performs a fair toss of a three-sided coin (i.e., randomly choosing one of the physical processes). It is noted that any type of heuristic algorithm could also be used.

The mapping from logical to physical processes, and thus the information in the mapping table, can change dynamically. As stated above, this mapping from logical to physical processes is duplicated at each mapping process. To maintain the mapping, any known system may be used including a variant of the TreeCast algorithm (see A. Teperman, M. Bach, Y. Moatti and D. Allon, "A Scalable Load Balancing Algorithm for Large Networks of Computers" IBM Isreal Science and Technology, Technology report TR88.313, December 1991 (incorporated herein by reference)) which is a fault-tolerant scalable algorithm for distributing information over large networks. Generally, the algorithm is used to dynamically and fault-tolerantly organize the physical processes by implementing the mapping processes into a spanning tree. Once organized into a spanning tree, information can be "tree cast" to all of the processes on the tree. The organization into a tree is dynamic in the sense that processes can join and leave the tree as the system is running. If a non-leaf node leaves the tree, the tree is automatically reconfigured. In addition, trees can be merged and split.

FIG. 5 depicts a second mapping table that shows how the logical process mechanism can be used to dynamically reconfigure server processes. This figure shows the mapping table after the work for logical process 1, of class DSM-LLSP, is redistributed among four physical processes (as opposed to two shown in FIG. 5). A client of a logical server need not be aware of this reconfiguration. It will continue to address its messages to logical process 1. However, the selection function will now automatically redirect this message to one of four physical processes as opposed to one of two.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in the light of the above teaching without departing from the spirit and scope of the following claims.

I claim:

1. A distributed network for use by the world wide web, said distributed network comprising:
   a web browser residing on a client system wherein said web browser includes a system for selecting a logical process and a mapping system for mapping said logical process to one of a plurality of physical processes, said mapping system including a programmable selection function for automatically selecting one of said plurality of physical processes to service the selected logical process, wherein the logical process has a unique logical address; and
   a single web site associated with the unique logical address, the single web site utilizing a plurality of servers, wherein said plurality of physical processes are distributed among the plurality of servers and wherein each physical process has its own unique physical address.

2. The distributed network of claim 1 wherein said programmable selection function is downloadable into said client system.

3. The distributed network of claim 1 wherein said programmable selection function is downloaded as a Java applet.

4. A program product, said program product comprising:
   a recordable media; and
   a web browser stored on said recordable media wherein said web browser selects a logical process and maps said logical process to one of a plurality of physical processes, said browser further including a programmable selection function for automatically selecting one of said plurality of physical processes to service the selected logical process.

5. The program product of claim 4 wherein said selection function is downloadable into said client system.

6. The program product of claim 4 wherein said plurality of physical processes comprise web pages.

7. The program product of claim 4 wherein said programmable selection function is downloaded as a Java applet.

8. A distributed computing system comprising:
   a plurality of client systems, wherein each of said client systems includes a mechanism for selecting a logical process that has a logical address and wherein each of said client systems includes a mapping system for mapping said logical process to one of a plurality of physical processes;

a plurality of physical server systems, said plurality of server systems each including at least one of said physical processes, each of said physical processes further having a physical address.

9. The distributed computing system of claim 8 wherein said mapping system includes a first selection mechanism for returning the location of a page of a distributed shared memory.

10. The distributed computing system of claim 9 wherein said distributed shared memory is partitioned over a plurality of physical server systems.

11. The distributed computing system of claim 8 wherein said mapping system includes a second selection mechanism that selects one of a subset of physical processes wherein each of said physical processes within said subset are functionally equivalent.

12. The distributed computing system of claim 8 wherein said mapping system includes a third selection mechanism that maps a plurality of logical processes to a single predetermined physical process.

13. The distributed computing system of claim 8 wherein said mapping system includes a caching system.

14. The distributed computing system of claim 8 wherein said logical process includes a universally unique and persistent identifier.

15. A mapping interface system for mapping logical processes to physical processes, said system comprising:

a first mapping process for mapping a first class of logical processes to one of a plurality of physical processes wherein each of said plurality of physical processes are functionally equivalent but reside at different physical addresses;

a second mapping process for mapping a second class of logical processes, said process including means for returning a location of a page of distributed shared memory; and a third mapping process for mapping a third class of logical processes to a single physical process.

16. A method of handling distributed processes on a world wide web system that includes web sites having a plurality of physical server addresses, said method including the steps of:

initiating a logical process from a web browser;

checking a cache associated with said web browser to determine if a mapping function for said logical process exists therein;

for the case where said mapping function for said logical process exists in said cache, using said mapping function to ascertain a physical process address of a selected web site;

for the case where said mapping function for said logical process does not exist in said cache, performing the steps of:

downloading said mapping function from a mapping server to said cache; and using said mapping function to ascertain a physical process address of a selected web site; and contacting said web site with the physical process address obtained from said mapping function.

17. The method of claim 16 wherein said mapping server is located proximate said web site.

18. The method of claim 16 wherein said mapping function is downloaded into a cache in the form of a Java applet.

19. The method of claim 16 wherein said mapping function includes a predefined selection process for selecting physical processes.

* * * * *